United States Patent
El-Tarhuni et al.

(10) Patent No.: US 6,201,828 B1
(45) Date of Patent: Mar. 13, 2001

(54) FINE ESTIMATION OF MULTIPATH DELAYS IN SPREAD-SPECTRUM SIGNALS

(75) Inventors: Mohamed G. El-Tarhuni, Nepean; Anatoli V. Kotov, Ottawa, both of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/190,765

(22) Filed: Nov. 12, 1998

(51) Int. Cl.$^7$ .................................................. H04B 1/707
(52) U.S. Cl. ............................................ 375/150; 370/342
(58) Field of Search ................................. 375/130, 142, 375/147, 150, 152, 343, 367; 370/320, 335, 342, 517

(56) References Cited

U.S. PATENT DOCUMENTS

| | | | |
|---|---|---|---|
| 5,796,775 | * | 8/1998 | Aoyama ............................. 375/208 |
| 5,867,525 | * | 2/1999 | Giallorenzi et al. ................. 375/206 |
| 5,926,502 | * | 7/1999 | Schilling ............................. 375/203 |

OTHER PUBLICATIONS

*Spread Spectrum Communications Handbook*, M.K. Simon, J.K. Omura, R.A. Scholz, and B.K. Levitt, Second Edition, 1994. pp. 901–903, 915.

* cited by examiner

*Primary Examiner*—Amanda T. Le
(74) *Attorney, Agent, or Firm*—Cobrin & Gittes

(57) ABSTRACT

In a spread-spectrum radio communication system in which transmissions occur with varying amounts of delay and in which the delay of a received signal must be determined in order to despread the signal, a system for refining the initial estimate of delay and for tracking the delay during an ongoing communication by correlating the signal at the estimated delay, an increment earlier than the estimated delay, and the same increment later than the estimated delay, and interpolating the early and late correlations normalized by the correlation at the estimated delay and by the increment to determine a refined estimate of the delay.

19 Claims, 4 Drawing Sheets

FINE ESTIMATION OF MULTIPATH DELAYS IN SPREAD-SPECTRUM SIGNALS

FIELD OF THE INVENTION

This invention relates generally to spread-spectrum radio communication systems such as CDMA systems, and particularly to synchronization of a receiver's despreading codes with the spreading codes used at a transmitter to spread the received signal, and most particularly to refining and maintaining the accuracy of synchronization of a receiver's despreading codes with a received signal.

BACKGROUND OF THE INVENTION

CDMA (code-division multiple access) systems are well known. See, generally, *CDMA Cellular Mobile Communications and Network Security*, Dr. Man Young Rhee, Prentice Hall 1998, ISBN 0-13-598418-1, and standard TIA/EIA/IS-95, hereinafter "IS-95".

In CDMA transmission between a base station and a plurality of mobile stations, all transmissions share all the bandwidth all the time. (Typically, all the transmissions from mobile stations to base share one band, and all transmissions from base to mobiles share another band.) Each mobile station's data stream is multiplied by binary codes (pseudonoise codes, or PN codes) in order to spread its spectrum, and typically is orthogonally modulated (as by Walsh-code modulation) to transform it from a series of bits into a series of PN "chips". Broadband signal received at the base station is converted from radio frequency back to baseband. At the base station signals from a plurality of mobile stations are, in effect, summed.

To decode the data stream from a particular mobile station, it is necessary to "correlate" the spread-spectrum signal with the same codes that the particular mobile station used for spreading its data stream. For this purpose, the base station is equipped with the same kinds of code generators as the mobile station and is able to produce "local replicas" of each base station's PN codes.

It remains to get the local replicas synchronized with the codes in a received signal. The received signal is subject to transmission delays, and the transmission delays may vary, especially if the mobile user is in motion. Furthermore, the received signal may include several multipath components from a mobile user. State-of-the-art base stations employ "rake" receivers which correlate each of the multipath components and recombine them, requiring that the transmission delay of each one be determined.

A base station typically includes an apparatus known as a "searcher" which can determine the delay of a signal from a mobile user, or under multipath conditions the delays of several multipath components of a signal from a mobile user, by attempting to correlate through a range of various amounts of delay and determining the amount of delay at which the best correlation occurs. The range of delay over which attempts are made is known as the "uncertainty region" and is chosen to include the range of greatest expected delay.

A typical state-of-the-art searcher can determine the transmission delay of a component within one-half of a PN chip duration. The searcher depicted in FIG. 1, for example, employs a plurality of correlators to correlate the signal against various delay amounts of the local replica PN codes against the input signal, each sequence being delayed from the previous one by an amount "delta". Most of the correlations will be "noise" except for those that correspond to the signal (including a multipath component) coded with that PN code which will produce a value above the noise. The transmission delay of each component can then be determined with a granularity of "delta" taken as one-half a PN chip duration for the present discussion.

A signal correlated against a perfectly synchronized local replica would yield the maximum signal-to-noise ratio (SNR) attainable from that signal, and SNR would decrease as synchronization decreases. For example, for a discrepancy of one-half a PN chip in determining delay, SNR could decrease up to 2.5 db. To maximize performance, particularly regarding SNR of received signals, there is a need to determine transmission delay with accuracy significantly greater than one-half of a PN chip duration.

It is also necessary to "track" the transmission delay of the components, as it may vary during a user's call, particularly if he is in motion. With reference to pages 901 et. seq. of *Spread Spectrum Communications Handbook*, M. K. Simon, J. K. Omura, R. A. Scholz and B. K. Levitt, Second Edition, 1994, one finds that there are two PN tracking loop configurations in predominant use, namely, the delay-locked loop (DLL) and tau-dither loop (TDL). Both of them fall within the class of early-late gate type loops in that the received PN code is correlated either simultaneously or alternately with delayed and advanced version of the receiver local code PN generator output to produce the error correcting characteristic. Both are complex and calculation-intensive.

The tracking problem is compounded by frequency-selective fading, which degrades the performance of the prior-art tracking loops. In addition, new requirements of emerging systems with intensive data traffic are adding considerable complexity, and therefore more system cost. There is thus a need for a delay tracking loop that introduces little complexity and cost.

It is thus an object of the present invention to determine the transmission delay of a spread-spectrum signal to an accuracy of at least within one-eighth of a PN chip duration at low cost and with low complexity.

It is a further object of the present invention to track the transmission delay of an ongoing spread-spectrum signal at low cost and with low complexity.

These and other objects of the invention will become apparent to those skilled in the art from the following description thereof.

SUMMARY OF THE INVENTION

In accordance with the teachings of the present invention, these and other objects may be accomplished by the present systems and methods of generating despreading codes with refined estimates transmission delays in CDMA systems. An embodiment of the present invention includes correlating a CDMA signal with PN codes at an estimated delay, an increment earlier than the estimated delay, and the same increment later than the estimated delay, and interpolating the early and late correlations normalized by the estimated delay and the increment to obtain a refined estimate of delay. A practice of the invention makes these correlations with values available in a conventional searcher for refining an initial estimate of transmission delay. Another practice of the invention provides a delay-locked loop for inclusion in a rake receiver to dynamically track the transmission delay.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

Figure 1:
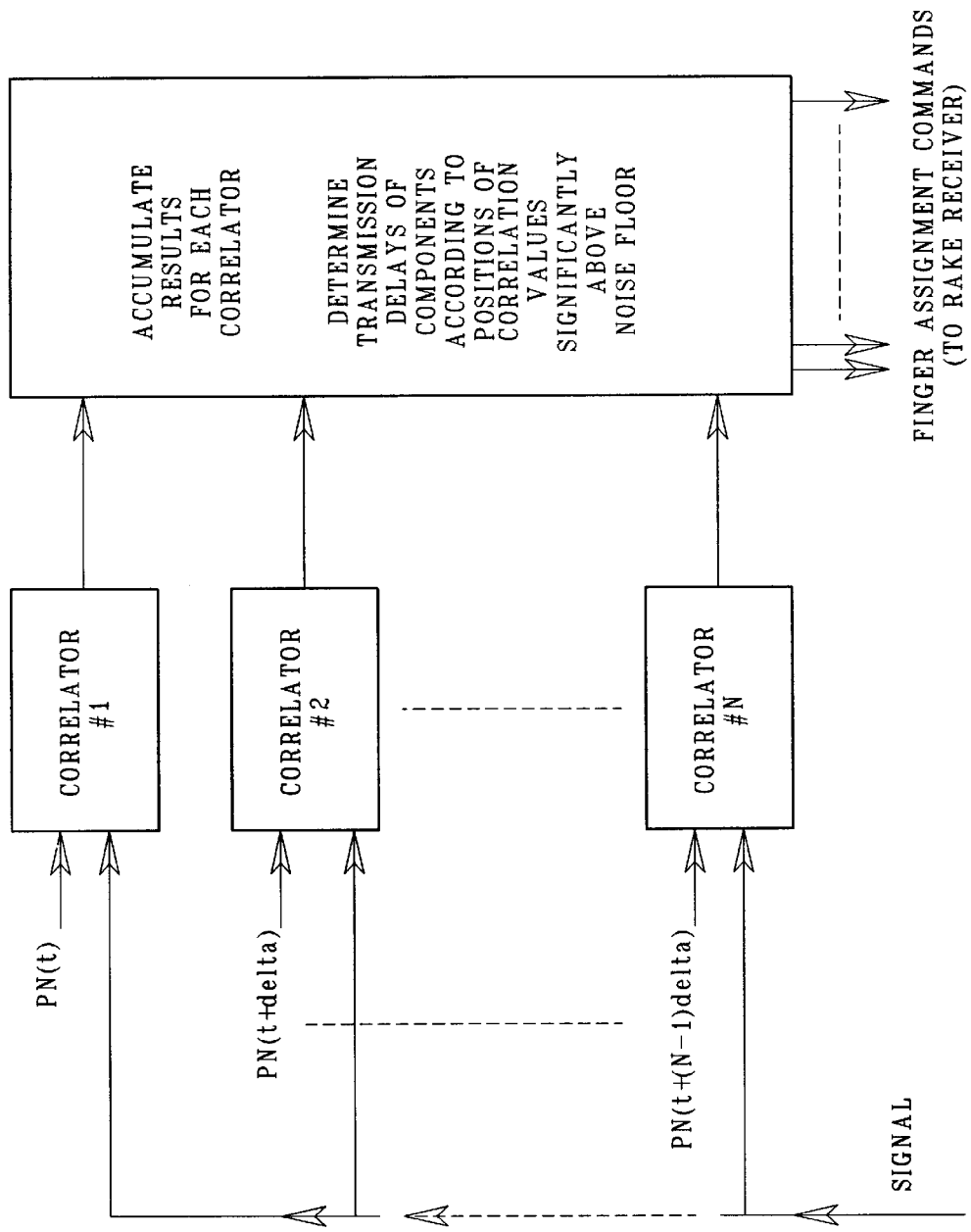
FIG. 1 is a block diagram of a conventional searcher for use in a CDMA receiver.

FIG. 1 is a high level block diagram of a conventional searcher of a CDMA receiver. The signal to be received was spread at the transmitter by multiplication by pseudonoise (PN) codes, and will be despread at the receiver according to "local replicas" of the PN codes. However, the signal has probably undergone delay during transmission. The local replicas will have to be delayed by the same amount to successfully despread the signal. Thus, the amount of transmission delay must be determined. The range of delays from zero to the maximum that can be expected is known as the uncertainty region. A searcher such as that of FIG. 1 correlates the signal against the local replica in various amounts of delay in increments of delay connoted as "delta". The number of correlators N is sufficient that N×delta is at least equal to the uncertainty region.

The outputs of the correlators are accumulated over some period of time to produce a series of correlation values. Correlation values corresponding to components of signal matching the PN local replica at actual transmission delays will accumulate significant values, while others will accumulate relatively small "noise" values. The delays and relative amplitudes of the signal and its multipath components (if any) can be determined according to the relative positions among the correlation values of those values that show magnitude significantly above the "noise floor" of the correlation values. The delays are inherently determined with a granularity equal to delta. In state-of-the-art searchers delta is typically one-half a PN chip duration. This value will be treated as exemplary in the present discussion.

As is well known in the art, CDMA systems generally employ "rake receivers" for despreading and demodulating received signals. A rake receiver has a plurality of "fingers" the outputs of which are summed. Each finger includes a digital demodulator which will despread and demodulate one component of the signal according to the local replica PN code delayed by an amount determined in the searcher. Each finger also includes a delay before the demodulator; the delays in the fingers are set relative to delay of the local replica PN code so that the correlations of the components will be cumulative. Each finger further includes a weighting circuit at its output which is set according to the signal-to-noise ratio (SNR) of that component as determined by the searcher or by means within the finger's digital demodulator.

Figure 2:
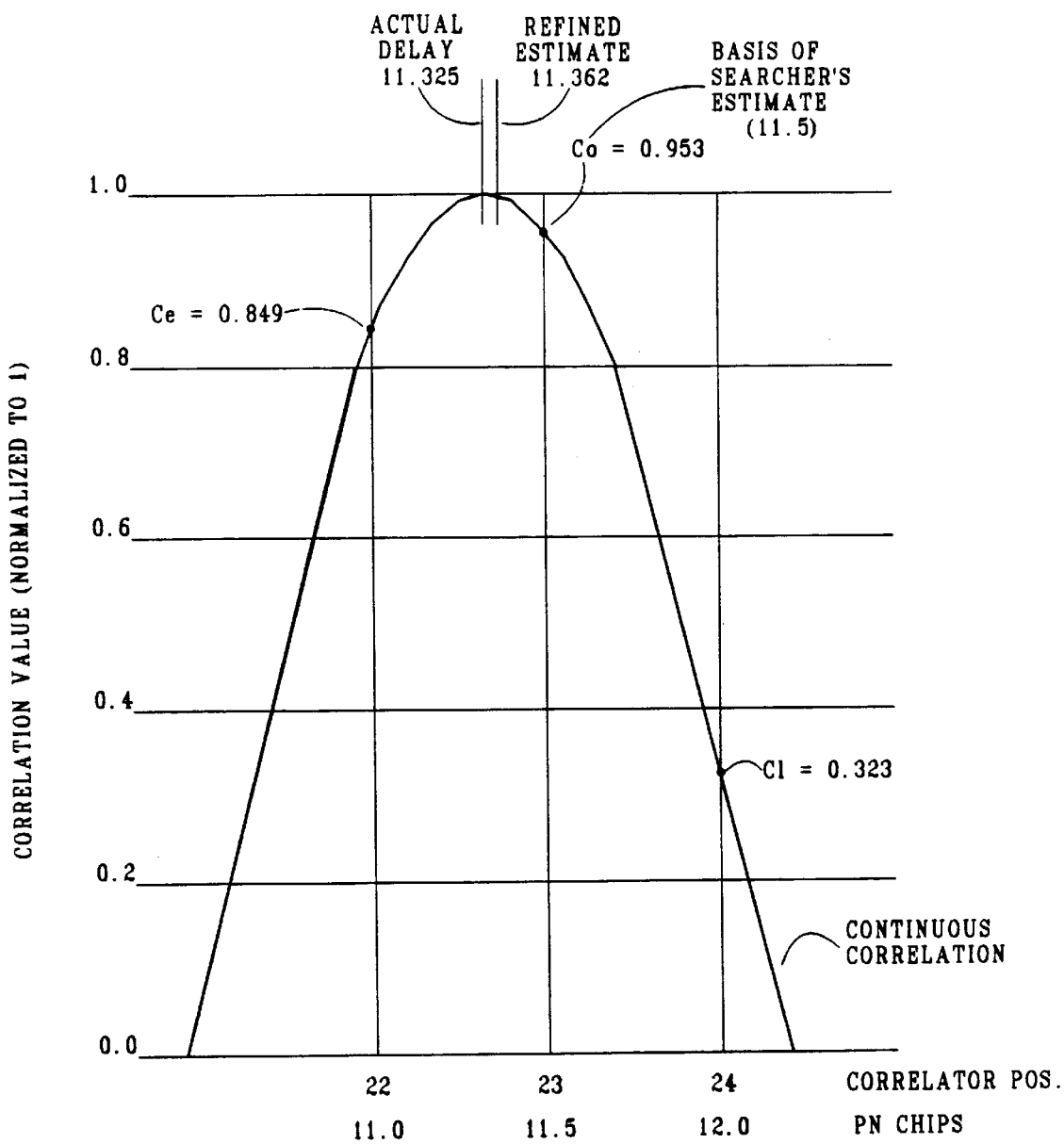
FIG. 2 depicts the interaction of a conventional searcher and the present invention with a graph of correlation values for a typical signal.

To obtain better initial correlation, it would be desirable to know a signal's transmission delay more accurately than the one-half PN chip granularity determined by a conventional searcher. FIG. 2 depicts a curve labelled "continuous correlation" which represents correlation values that would occur at all possible PN local replica delays over a chosen range for an assumed signal. The transmission delay of the signal is seen to be 11.325 PN chips.

However, the searcher is constrained to finding correlation values only at discrete values of PN local replica delay, assumed here to be at intervals of one-half a PN chip duration. In the example depicted in FIG. 2, the searcher finds a maximum value in the twenty-third correlation value, corresponding to 11.5 PN chip durations. In a receiver of the prior art, the rake receiver finger assigned to this signal component would be informed to operate with a delay of 11.5 PN chips.

The present invention, however, provides a simple way of refining the estimate by performing an interpolation based on the symmetry of the "continuous correlation" curve and normalized to the maximum value found by the searcher and to the correlator step size. Using the curve of the example of FIG. 2, the maximum value occurs at correlator position 23 and has a value of 0.953; this is denominated "Co". The value at the next later correlator position after the maximum value, denominated "Cl", has a value of 0.323. The value at the next earlier correlator position before the maximum value, denominated "Ce", has value 0.849. The searcher uses "delta" (step size in terms of PN chips) of 0.5. The invention provides for calculating an adjustment "sigma" to be applied to the searcher's initial estimate:

$$\text{sigma} = \frac{Cl - Ce}{Co} \times \frac{\text{delta}}{2} \qquad \text{(Equation 1)}$$

For the numbers occurring in FIG. 2, Equation 1 evaluates as $$\text{sigma} = \frac{0.323 - 0.849}{0.953} \times \frac{1}{4} = -0.138$$

Thus, the initial estimate of the transmission delay of this component is refined from 11.5 PN chips to (11.5−0.138) PN chips, or 11.362 PN chips. While this is not precisely equal to the actual delay of 11.325, it is a significant improvement over the searcher's raw estimate of 11.5, and will result in better demodulation (greater SNR) of the signal in the rake receiver.

The means for performing this calculation are not shown, but it is well within the skill of those in the art to provide any of hardware, software, or firmware to perform the calculation on numbers already available in a conventional searcher.

The invention also finds application in "delay tracking", i.e., maintaining an accurate assessment of transmission delay during an ongoing call, although the delay is subject to change, and although the assessment may be hampered by signal fading. Prior-art tracking loops are presented in the aforementioned *Spread Spectrum Communications Handbook*. The present invention provides a delay tracking loop that improves tracking accuracy over the prior-art loops without increasing circuit complexity or calculation complexity, and without decreasing the time difference between "early" and "late" correlations. The prior-art loops can increase accuracy by decreasing the early-to-late time difference, which increases the risk of an "out-of-lock" condition in which the actual delay misses the window between the early and late correlations.

Figure 3:
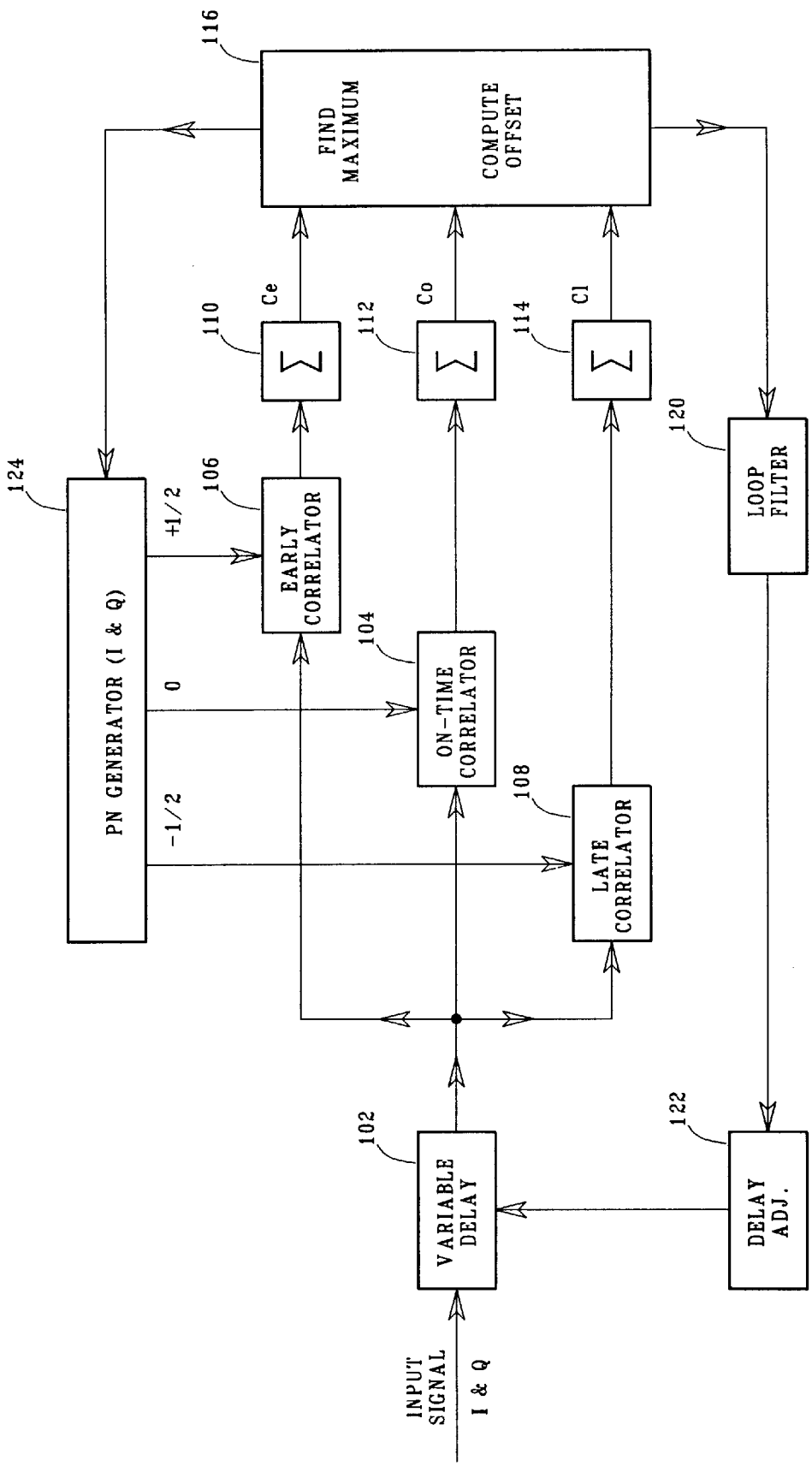
FIG. 3 is a block diagram of the delay-locked loop of the present invention.

FIG. 3 depicts a delay-locked loop (DLL) of the present invention. It may be deployed as part of a finger of a rake receiver. Its "on-time correlator" 104 may be identical with the correlator used by the rake receiver for demodulation.

Signal is input through variable delay 102, initially set for a delay of zero. The PN generator 124 for generating the local replica of the PN codes has outputs at the current delay estimation (denoted "0"), half a PN-chip time earlier than the delay estimation (denoted +½), and half a PN-chip time later than the delay estimation (denoted -½). Shift registers are commonly used for producing the PN code replicas, and it is a simple matter to employ different taps on a shift register to produce the three amounts of delay.

The DLL employs three correlators: early correlator 106 correlates against the early output of the PN generator; on-time correlator 104 correlates against the "0" output; late correlator 108 correlates against the late output. Accumulators 110, 112, 114, accumulate the early, on-time, and late correlation values respectively. Outputs of the accumulators are named Ce, Co, and Cl respectively.

Figure 4:
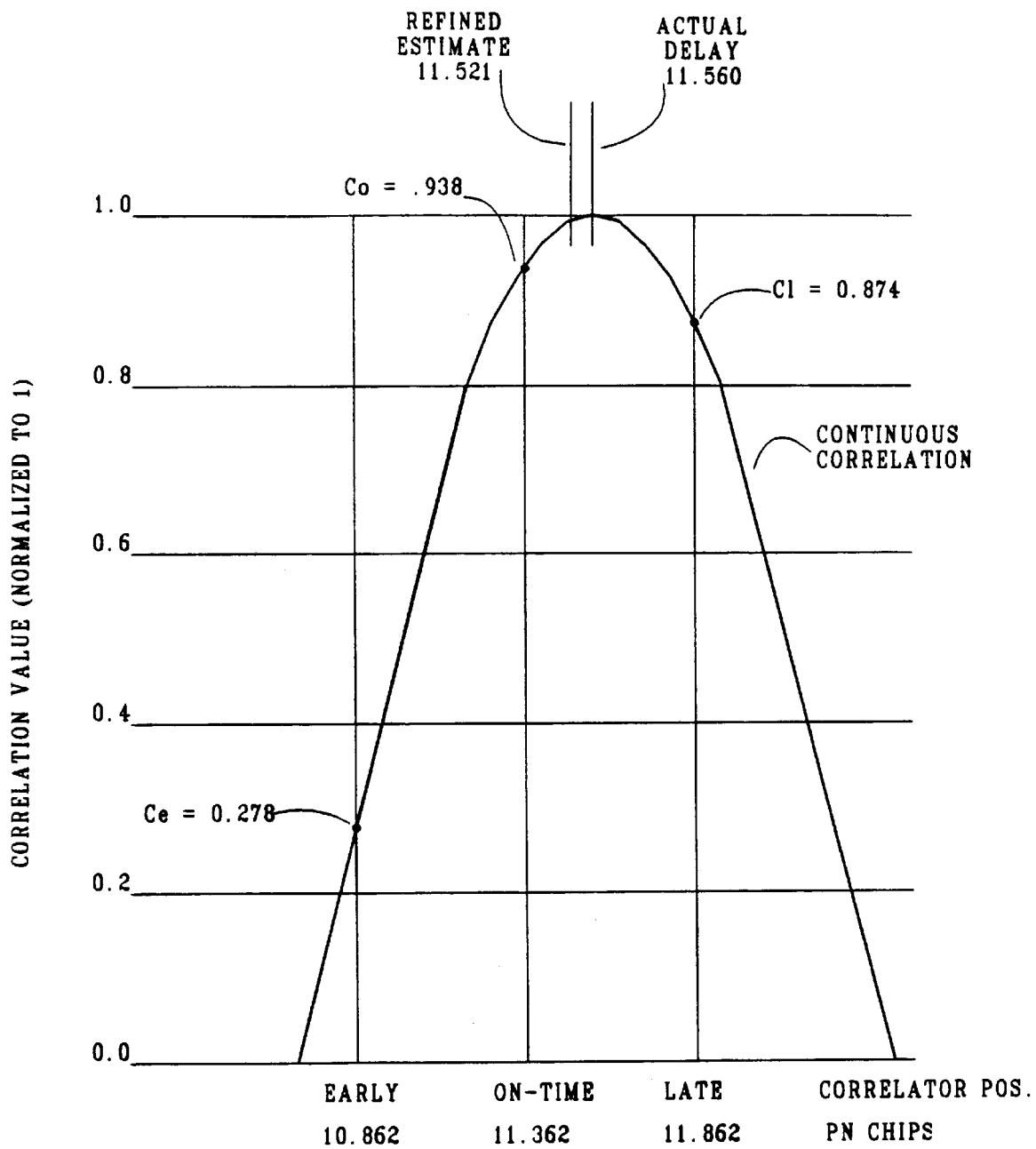
FIG. 4 depicts the interaction of the delay-locked loop of the present invention with a graph of correlation values for a typical signal.

FIG. 4 depicts a situation in which in the DLL of FIG. 3, PN code generator 124 is providing the "0" PN code local replica at a delay of 11.362 PN chips as instructed during the example given in the discussion of FIG. 2. Accordingly, the +½ output is at a delay of 10.862 PN chips, and the -½ output is at a delay of 11.862 PN chips. It is now assumed by way of example that the actual delay has shifted (perhaps because the mobile user originating the signal is in motion) to 11.560 PN chips. The rake receiver is still correlating at a delay of 11.362 PN chips, and thus is not achieving the best possible correlation.

Periodically, the DLL of FIG. 4 checks the delay, and makes refinements if necessary. (In an embodiment of the invention in a CDMA radio system conforming to the IS-95 standard, the DLL is activated at the start of every frame, or every 20 milliseconds.) Accumulators 110, 112, and 114 accumulate the values Ce, Co, and Cl respectively for a predetermined amount of time, substantially less than the time between the periodic uses of the DLL.

The functions of block 116 may be performed in a generic arithmetic-logic unit (ALU) comprising any of hardware, software, or firmware as is known to those in the art. It is first determined which of the values Ce, Co, and Cl is the maximum. In the example of FIG. 4 (and in typical practice), Co will have the greatest value. Should Ce or Cl have the greatest value, an "out of lock" condition is said to have occurred. PN generator 124 is adjusted in the appropriate direction by a half PN chip delay in preparation for the next pass of the DLL. This typically would occur only in the event of unusually large and rapid changes in the transmission delay.

From FIG. 4, Ce takes a value 0.278, Co a value of 0.938, and Cl a value of 0.874. Inserting these values into Equation 1 yields $$\text{sigma} = \frac{0.874 - 0.278}{0.938} \times \frac{1}{4} = -0.159$$

ALU 116 makes this computation, and through loop filter 120 instructs delay adjustment block 122 to adjust delay 102 accordingly. Effectively, the rake receiver will thenceforth be correlating with a delay of (11.362+0.159), or 11.521 PN chips. While this is slightly different from the actual delay of 11.560 PN chips, it is a significant improvement over the former value of 11.362 PN chips.

It will thus be seen that the invention efficiently attains the objects set forth above, among those made apparent from the preceding description. In particular, the invention provides simple and rapid means of refining the initial estimate of transmission delay of a spread-spectrum signal, and of tracking the estimate during an ongoing series of transmissions. Those skilled in the art will appreciate that the calculations provided by the present invention in conjunction with a searcher of the prior art facilitate the refinement of the initial estimate, and in conjunction with the configuration depicted in FIG. 3 facilitate tracking of the estimate.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a spread-spectrum radio communication system in which transmitted signals are spread according to one or more pseudonoise (PN) code sequences into PN chips of predetermined duration, the system having a searcher for estimating transmission delay of a transmission by:

receiving the signal;

correlating the received signal against a plurality of sequences of local replicas of said PN codes, each local replica sequence starting at an offset a predetermined positive real number "delta" of PN chip durations later than its predecessor;

accumulating a correlation value corresponding to each local replica sequence; and estimating the transmission delay as a number of PN chip durations equal to a delay of a local replica sequence associated with a greatest one of said correlation values, a method of refining the transmission delay estimate comprising the steps of:

determining a magnitude Co being a magnitude of said greatest one of said correlation values;

determining a magnitude Ce being a magnitude of a correlation value associated with offset of a local replica sequence immediately prior to said local replica sequence associated with said greatest one of said correlation values;

determining a magnitude Cl being a magnitude of a correlation value associated with offset of a local replica sequence immediately after said local replica sequence associated with said greatest one of said correlation values;

determining a transmission delay increment equal to $$\frac{Cl - Ce}{Co} \times \frac{\text{delta}}{2,}$$

and adjusting the transmission delay estimate by the amount of the transmission delay increment.

2. The method recited in claim 1 practiced in a spread-spectrum radio communication system that is a CDMA radio communication system.

3. The method recited in claim 2 practiced in a CDMA radio communication system that conforms to one of:

ITU IS-95 standard; or

ITU Cdma2000 proposal by TR45.5 TIA.

4. The method recited in claim 1 practiced in a radio communication system wherein delta is equal to 0.5.

5. In a spread-spectrum radio communication system in which transmitted signals are spread according to one or more pseudonoise (PN) code sequences into PN chips of predetermined duration, the system having means for estimating transmission delay of a transmitted signal and having at least one demodulator for demodulating the signal according to a local replica of said PN codes as delayed by said transmission delay estimate, a method to be performed periodically for refining the transmission delay estimate comprising the steps of:

determining time intervals T1 and T2 where T1 is substantially greater than the duration of one PN chip and T2 is equal to a positive real number S, not substantially greater than one, of PN chip durations;

correlating the signal during the interval T1 against the local replica of the PN code as delayed by the transmission delay estimate and to produce first correlation values and accumulating the first correlation values to produce a first correlation sum denoted Co;

correlating the signal during the interval T1 against the local replica of the PN code as delayed by the transmission delay minus the interval T2 to produce second correlation values and accumulating the second correlation values to a produce a second correlation sum denoted Ce;

correlating the signal during the interval T1 against the local replica of the PN code as delayed by the transmission delay plus the interval T2 to produce third correlation values and accumulating the third correlation values to produce a third correlation sum denoted Cl;

determining a transmission delay increment equal to $$\frac{Cl - Ce}{Co} \times \frac{S}{2},$$

and adjusting the transmission delay estimate by the amount of the transmission delay increment.

6. The method recited in claim 5 practiced in a spread-spectrum radio communication system that is a CDMA radio communication system.

7. The method recited in claim 6 practiced in a CDMA radio communication system that conforms to one of:
ITU IS-95 standard; or
ITU Cdma2000 proposal by TR45.5 TIA.

8. The method recited in claim 7 wherein the method is performed once every frame.

9. The method recited in claim 5 practiced in a radio communication system wherein S is equal to 0.5.

10. In a spread-spectrum radio communication system in which transmitted signals are spread according to one or more pseudonoise (PN) code sequences into PN chips of predetermined duration, the system having means for estimating transmission delay of a transmitted signal and having at least one demodulator for demodulating the signal according to a local replica of said PN codes as delayed by said transmission delay estimate, apparatus for periodically refining the transmission delay estimate comprising:

means for correlating the signal during an interval T1, where T1 is substantially greater than the duration of one PN chip, against the local replica of the PN code as delayed by the transmission delay estimate to produce first correlation values;

means for accumulating the first correlation values to produce a first correlation sum denoted Co;

means for correlating the signal during the interval T1 against the local replica of the PN code as delayed by the transmission delay minus an interval T2, where T2 is equal to a positive real number S, not substantially greater than one, of PN chip durations, to produce second correlation values;

means for accumulating the second correlation values to produce a second correlation sum denoted Ce;

means for correlating the signal during the interval T1 against the local replica of the PN code as delayed by the transmission delay plus the interval T2 to produce third correlation values;

means for accumulating the third correlation values to produce a third correlation sum denoted Cl;

means for determining a transmission delay increment equal to $$\frac{Cl - Ce}{Co} \times \frac{S}{2},$$

and means for adjusting the transmission delay estimate by the amount of the transmission delay increment.

11. The apparatus recited in claim 10 in a spread-spectrum radio communication system that is a CDMA radio communication system.

12. The apparatus recited in claim 11 in a CDMA radio communication system that conforms to one of:
ITU IS-95 standard; or
ITU Cdma2000 proposal by TR45.5 TIA.

13. The apparatus recited in claim 12 wherein the transmission delay estimate is refined once every frame.

14. The apparatus recited in claim 10 in a radio communication system wherein S is equal to 0.5.

15. In a spread-spectrum radio communication system in which transmitted signals are spread according to one or more pseudonoise (PN) code sequences into PN chips of predetermined duration, the system having means for estimating transmission delay of a transmitted signal and having at least one demodulator for demodulating the signal according to a local replica of said PN codes as delayed by said transmission delay estimate, apparatus for periodically refining the transmission delay estimate comprising:

a variable delay for delaying the signal input to the demodulator;

a first correlator for correlating the signal during an interval T1, where T1 is substantially greater than the duration of one PN chip, against the local replica of the PN code as delayed by the transmission delay estimate to produce first correlation values;

a first accumulator for accumulating the first correlation values to produce a first correlation sum denoted Co;

a second correlator for correlating the signal during the interval T1 against the local replica of the PN code as delayed by the transmission delay minus an interval T2, where T2 is a positive real number S of PN chip durations not substantially greater than one, to produce second correlation values;

a second accumulator for accumulating the second correlation values to produce a second correlation sum denoted Ce;

a third correlator for correlating the signal during the interval T1 against the local replica of the PN code as delayed by the transmission delay plus the interval T2 to produce third correlation values;

a third accumulator for accumulating the third correlation values to produce a third correlation sum denoted Cl; and an ALU for determining a transmission delay increment equal to $$\frac{Cl-Ce}{Co} \times \frac{S}{2},$$

the variable delay being responsive to the ALU for changing the amount of its delay according to the transmission delay increment.

16. The apparatus recited in claim 15 in a spread-spectrum radio communication system that is a CDMA radio communication system.

17. The apparatus recited in claim 16 in a CDMA radio communication system that conforms to one of:
 ITU IS-95 standard; or
 ITU Cdma2000 proposal by TR45.5 TIA.

18. The apparatus recited in claim 17 wherein the transmission delay estimate is refined once every frame.

19. The method recited in claim 15 in a radio communication system wherein S is equal to 0.5.

* * * * *